UNITED STATES PATENT OFFICE.

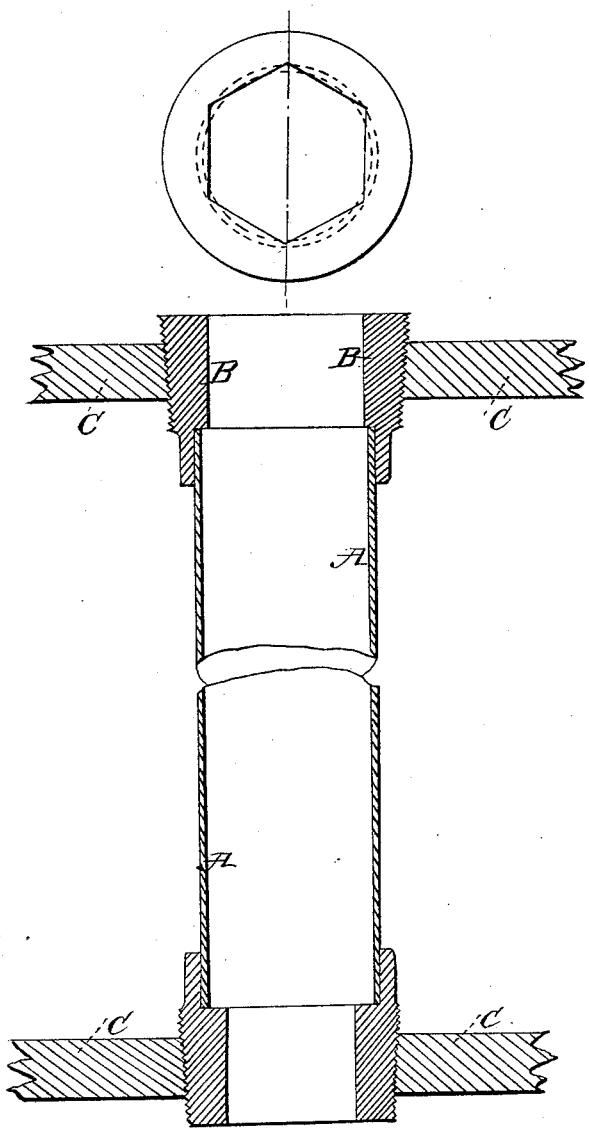

BARNABAS H. BARTOL, OF PHILADELPHIA, PENNSYLVANIA.

IMPROVEMENT IN SCREWING TUBES IN VACUUM-PANS.

Specification forming part of Letters Patent No. 18,669, dated November 24, 1857.

*To all whom it may concern:*

Be it known that I, BARNABAS H. BARTOL, of the city and county of Philadelphia, State of Pennsylvania, have invented a new and Improved Method of Inserting Tubes in Vacuum-Pans, Condensers, and Boilers; and I do hereby declare that the following is a full and exact description.

The nature of my invention consists in the particular manner of constructing the tubes for vacuum-pans, condensers, and boilers, so that they may be easily taken out and replaced by means of a long many-sided mandrel without injury to the tubes, vacuum-pans, condensers, or boilers, and without the necessity of allowing the ends of said tubes to project beyond the tube-sheets.

To enable others skilled in the art to make and use my invention, I will proceed to describe its construction and operation.

The tubes have securely fixed at each end and forming a part of them conical pieces of metal, which have cut on their exterior surfaces a screw. One end of the tube is made smaller than the other to enable it to pass through the tube-sheet of the large end. A screw is cut in both tube-sheets by means of a long taper tap, so that each set of holes are of the same size. The screw on the tubes is cut in the lathe to insure the same accuracy. The core or hole through the conical pieces at the ends of the tubes may be of any form that will admit of their being screwed in place by means of a long mandrel passed through the tube, or the hole may be round and the conical ends have a projecting piece with several sides to them, by means of which the tubes may be screwed in.

Referring to the drawings, A in Figure 1 shows the tube, B B the conical ends, and C C the tube-sheets.

Figs. 2 and 3 show the holes in the conical ends, by means of which the tube is screwed in place. In some cases it is desirable that the ends of the tubes should not project beyond the surface of the tube-sheets. By my plan of making the interior of the tube many-sided this can be readily done, while with all other tubes where a wrench or its equivalent is applied to the outside of the tube its end or ends must of necessity project beyond the tube-sheets, so as to leave something to grasp and hold on to, so that while I may allow the ends of the tubes to project, if for any purpose it should be found preferable, yet I can leave them flush with or even below the surfaces of the flue-sheets when that is desirable and still by the many-sided mandrel place, remove, and replace them at pleasure.

Having thus fully described the nature and object of my invention, I would state that I do not claim screwing tubes into tube-sheets, as this has been done; but

What I do claim as new, and desire to secure by Letters Patent, is—

The making of the tubes many-sided in their interior parts, so that by the use of a many-sided long mandrel fitting into said interior they may be placed, removed, or replaced without the necessity of having the ends of said tubes project beyond the tube-sheets, substantially as herein set forth.

BARNABAS H. BARTOL.

Witnesses:
HARTLEY MERRICK,
F. H. GERMON.